United States Patent [19]
Reynolds

[11] 3,807,080
[45] Apr. 30, 1974

[54] FISH DE-HOOKER

[76] Inventor: Jack D. Reynolds, 4762 18th Ave., St. Petersburg, Fla. 33063

[22] Filed: Feb. 3, 1970

[21] Appl. No.: 885,497

[52] U.S. Cl. ................................................. 43/53.5
[51] Int. Cl. ............................................. A01k 97/00
[58] Field of Search ............ 43/53.5, 4, 1; 40/125 H

[56] References Cited
UNITED STATES PATENTS

| | | | |
|---|---|---|---|
| 2,887,817 | 5/1959 | Sharpe | 43/53.5 |
| 2,947,106 | 8/1960 | Lewan | 43/53.5 |
| 1,635,394 | 7/1927 | Anderson | 40/125 H |
| 1,858,152 | 5/1932 | Hallowell et al. | 40/125 H |
| 2,797,523 | 7/1957 | Dillard | 43/53.5 |

*Primary Examiner*—Antonio F. Guida
*Assistant Examiner*—Daniel J. Leach
*Attorney, Agent, or Firm*—Craig & Antonelli

[57] ABSTRACT

A fish dehooker formed by a support frame including a crossbar from which the fish is suspended by the hook embedded therein and a pivoting handle which may be rotated past the crossbar in close proximity thereto so as to push the fish off of the hook which is retained in the crossbar.

4 Claims, 4 Drawing Figures

PATENTED APR 30 1974 3,807,080
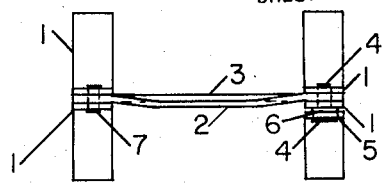
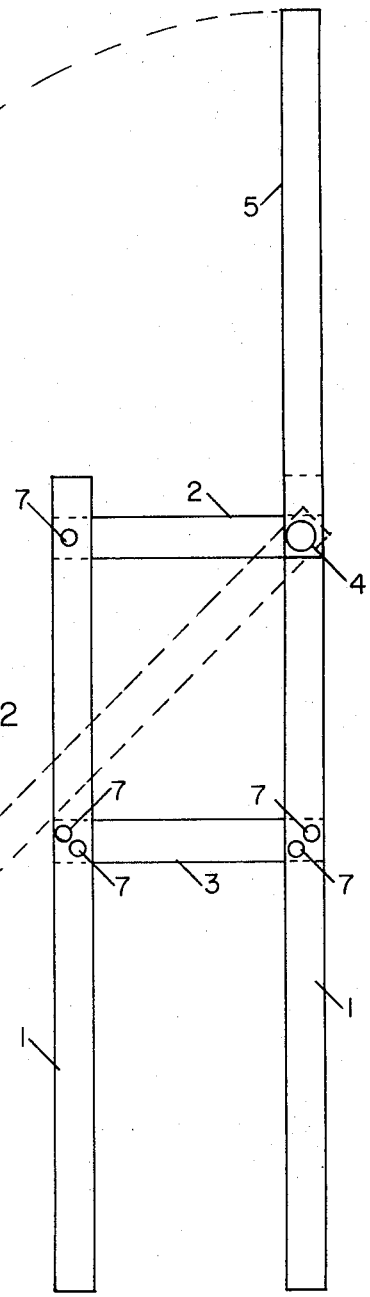 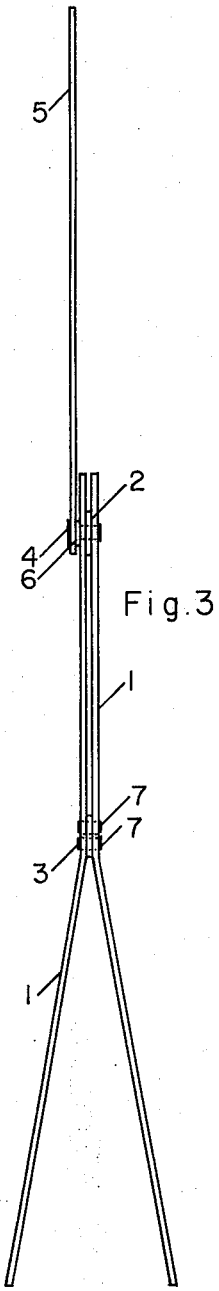
INVENTOR.
BY Jack D. Reynolds

FISH DE-HOOKER

The present invention relates in general to fishing equipment, and more particularly to a device for aiding in the removal of a hook embedded in a fish.

A primary object of the present invention is to provide a fish dehooker which provides an extremely efficient and expeditious way to effect the removal of a hook from a fish.

Another object of the present invention is to provide a fish dehooker which may be used successfully in either commercial or pleasure fishing.

In brief, the present invention is formed by a free standing support frame having a crossbar from which a fish may be suspended by the hook embedded therein. A pivotable handle on the support frame may be rotated past the crossbar in close proximity thereto to push the fish off of the hook.

These and other objects, features and advantages of the present invention will become more apparent from the following detailed description thereof, when taken in conjunction with the accompanying drawings, wherein:

FIG. 1 is a top plan view of the fish dehooker in accordance with the present invention;

FIG. 2 is a side plan view of the arrangement illustrated in FIG. 1;

FIG. 3 is an end plan view of the arrangement of FIG. 1; and

Figure 4:
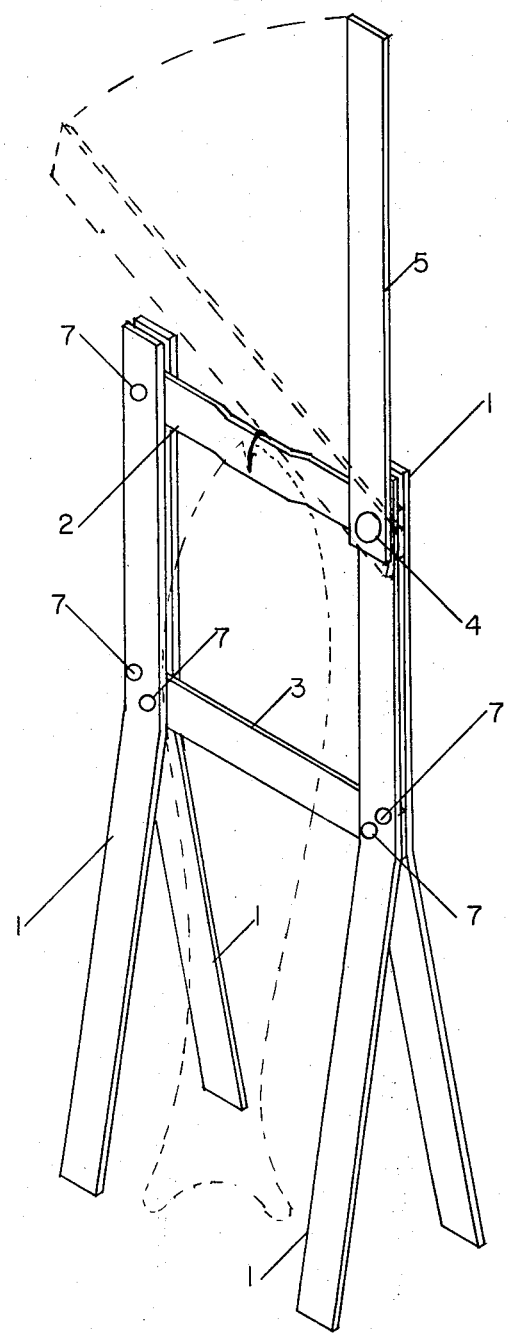
FIG. 4 is a perspective view of the arrangement forming the embodiment disclosed in this application.

As seen in the accompanying drawings, the present invention comprises a support frame formed of support pieces 1 riveted together in pairs to form sides of the support frame and having a cross brace 3 riveted at the central portion of the pairs of pieces 1 and an upper crossbar 2 riveted at the ends thereof to the pairs of pieces 1, thereby forming a free standing support frame. The pieces 1 are suitably bent at the middle thereof so that the lower portions extending downwardly from the cross brace 3 serve as legs which enable the free standing of the frame.

A handle 5 is pivotably secured to the upper portion of one of the pairs of support pieces 1 to enable pivoting thereof from a vertical orientation downward past the crossbar 2 in close proximity thereto. For this purpose, the crossbar 2, as seen in FIGS. 1 and 4, has an outwardly projecting center portion, so that in its downward movement the handle 5 will pass in very close proximity to the projecting center portion of the crossbar 2.

In operation, the fish having the hook caught therein is suspended on the protruding center portion of the crossbar 2 on the same side of the support frame as the handle 5. The handle 5 is then moved in a downward arc past the crossbar 2 so as to forcibly push the fish off of the hook. In this way, the fish can be positively and simply separated from the fish hook in an efficient and economical manner.

The support frame can be made from any suitable material; however, in one example of the present invention the elements 1, 2, 3, and 5 were made from one-eighth by three-fourths inch mild steel strips with the pieces 1 being 15 inches in length and the crossbar 2 and cross brace 3 having a length of 5 inches. The protruding center portion of the crossbar 2 is bent to a clearance of three sixty-fourths of an inch from the face of the frame. The securing members 7 may be rivets, as described above, or any other suitable fastener.

I claim:

1. A fish dehooker comprising a free standing support frame having a transverse crossbar from which a fish may be suspended by a hook embedded therein and a pivotable handle mounted on said support frame for movement past said crossbar in close proximity thereto so as to push the fish in a downward direction away from said crossbar and the hook thereon.

2. A fish dehooker as defined in claim 1 wherein said crossbar has a center protruding portion extending outward to one side of said frame.

3. A fish dehooker as defined in claim 2 wherein said support frame includes a plurality of elongated support pieces fastened together in pairs and being bent in a central portion thereof so that said pairs comprise outwardly extending leg portions, said pairs of support pieces being interconnected by a cross brace and said transverse crossbar.

4. A fish dehooker as defined in claim 3 wherein said handle is pivotally secured to one of said pairs of support pieces adjacent one end of said transverse crossbar.

* * * * *